Aug. 7, 1945.  C. J. KOPP  2,380,974
FLUID CONTROL VALVE
Filed Aug. 11, 1943  3 Sheets-Sheet 1

Inventor:
Carl J. Kopp,
By: Lee J. Gary
Attorney

Aug. 7, 1945.    C. J. KOPP    2,380,974
FLUID CONTROL VALVE
Filed Aug. 11, 1943    3 Sheets-Sheet 2
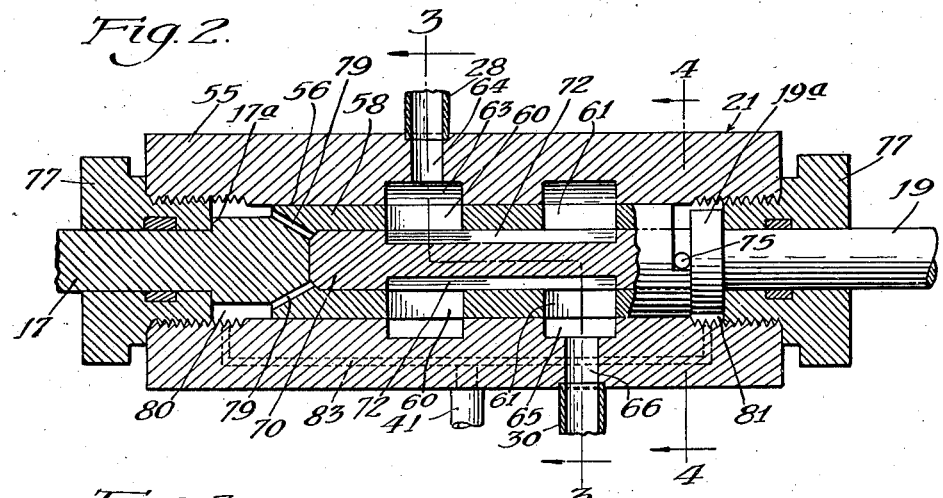
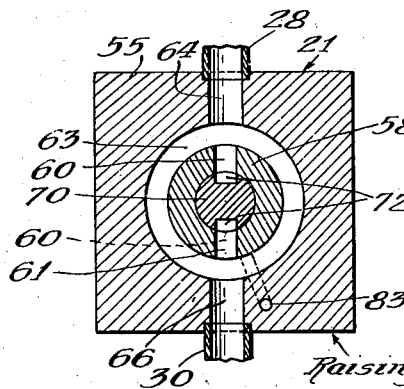
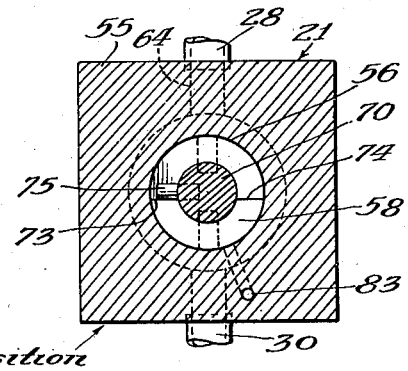
Raising Position
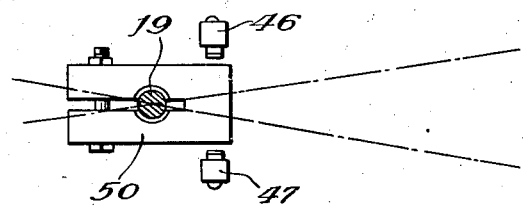
Inventor:
Carl J. Kopp,
By: Lee J. Gary
Attorney Aug. 7, 1945.  C. J. KOPP  2,380,974
FLUID CONTROL VALVE
Filed Aug. 11, 1943   3 Sheets-Sheet 3

Lowering Position

Neutral Position

Inventor:
Carl J. Kopp.
By: Lee J. Gary
Attorney.

Patented Aug. 7, 1945

2,380,974

UNITED STATES PATENT OFFICE 2,380,974

FLUID CONTROL VALVE

Carl J. Kopp, Chicago, Ill., assignor to Federal Electric Company, Inc., Chicago, Ill., a corporation of New York Application August 11, 1943, Serial No. 498,140

6 Claims. (Cl. 60—52)

The present invention relates to a novel fluid control apparatus, and also to a novel fluid valve construction especially suitable for use in controlling fluid operated devices such as pistons, diaphragms and other similar devices. Such fluid operated devices are widely utilized for controlling the movement or positioning of various mechanisms or apparatuses such as, for example, the platen of a press, or a bed of a milling or boring machine.

There have heretofore been employed various types of control apparatuses for operating fluid actuated devices, but in the main such constructions do not lend themselves to relatively accurate and instant controlling.

One of the objects of this invention is to provide a novel fluid control valve constructed and arranged to permit obtaining constant and uniform speed of movement of the apparatus being controlled.

Another object is to provide a novel fluid control valve which permits obtaining instant and accurate control of movement and/or positioning of apparatus being controlled.

A further object is to provide improved control means for controlling fluid operated mechanisms, actuated under direct manipulation of an operator, and wherein control means is automatically rendered inoperative in the event that the operator disengages himself from physical contact with the control means.

Still another object is to provide a novel valve for use in controlling fluid operated mechanisms wherein the valve includes a pair of cooperating rotatable elements, one adapted to be rotated by the fluid operated mechanism and the other being rotatable under direct control of an operator, by virtue of which exact and accurate control may be had over the mechanism being actuated.

Still a further object is to provide a novel and improved control for fluid operated mechanisms which is relatively simple in construction, positive in operation and which may be economically manufactured.

Other objects and advantages of this invention will be apparent from the following description, taken in connection with the accompanying drawings in which:

Fig. 2 is a vertical axial section through the control valve per se.

Fig. 3 is a staggered, transverse section through the valve, taken as indicated at line 3—3 on Fig. 2 showing a position of the parts for effecting raising of the piston element.

Fig. 4 is a transverse sectional view, taken as indicated at line 4—4 of Fig. 2.

Fig. 5 is a transverse section, taken as indicated on line 5—5 of Fig. 1 showing the friction switch operating mechanism.

It may be understood that the improved control apparatus embodying the present invention is equally suitable for use either with gas or liquid and for purpose of illustration it may be assumed that the apparatus as shown, and as hereinafter described, contemplates the use of liquid such as oil.

Figure 1:
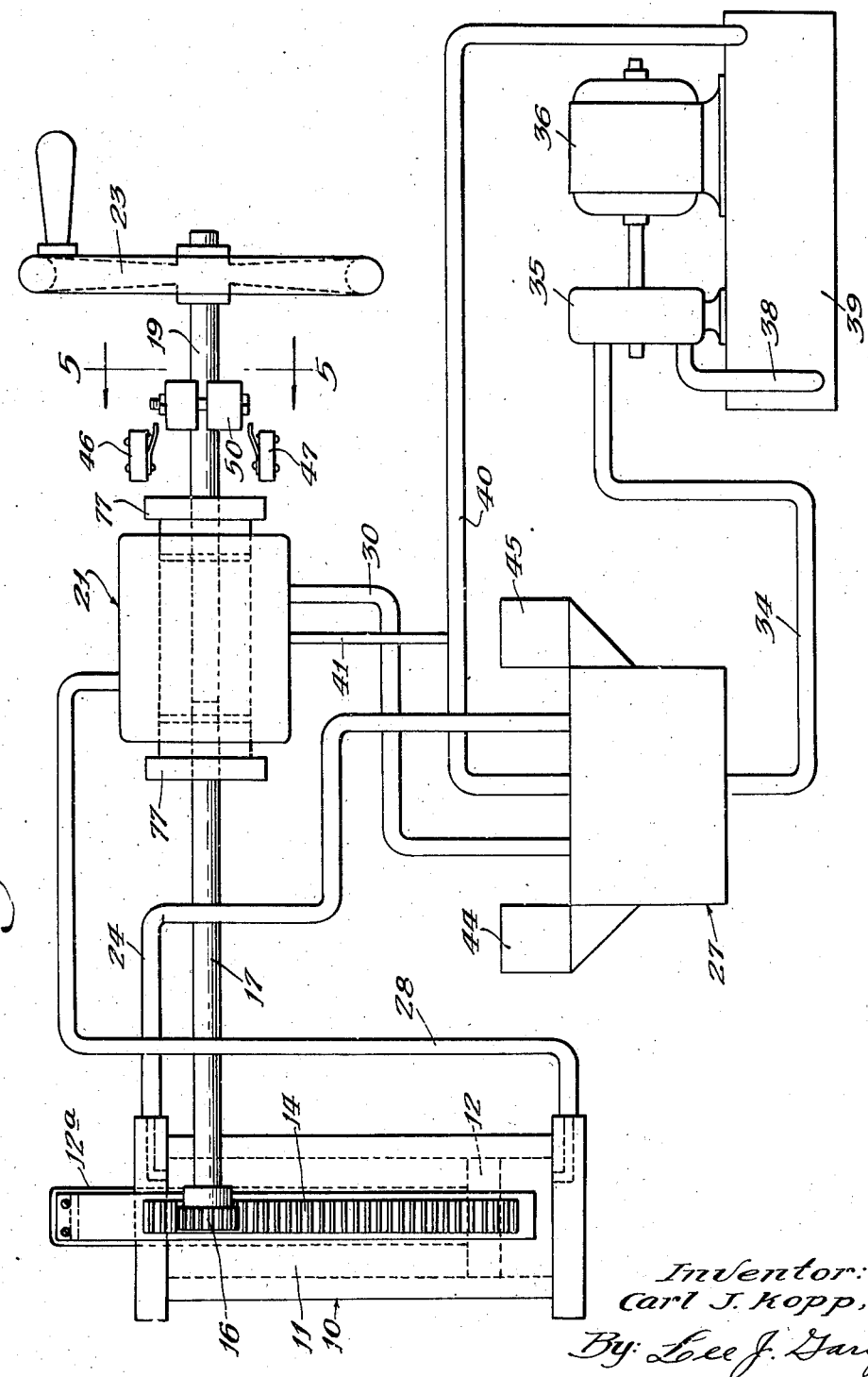
Fig. 1 is a schematic illustration of my novel control apparatus for controlling the movement and/or positioning of a fluid operated piston.

Referring now to the control apparatus illustrated schematically in Fig. 1 of the drawings, a hydraulic motor is indicated generally at 10, including an upright cylinder 11 and a piston element 12. The piston element is provided with a piston rod indicated at 12ª, connected at its upper end to a vertically movable toothed rack 14, slidably guided in the outer wall of the cylinder. Meshed with the rack 14 is a pinion 16, rigidly mounted on the outer end of a rotatable shaft 17. Mounted co-axially with the shaft 17 is a hand operated shaft 19, and the adjacent ends of said shafts 17 and 19 are operably connected to a control valve indicated generally at 21. Rigidly secured to the outer end of the shaft 19 is a hand operated control wheel 23, by virtue of which the control valve 21 may be instantly adjusted as to obtain accurate control of the movement or positioning of the piston element 12 within its cylinder 11. It is to be understood that the piston element, through its rod 12ª is operably associated with or connected to the apparatus to be moved or positioned, such as the platen of a press, or the bed of a machine. Therefore, the control of the valve 21 effects instant and accurate control of the movement or positioning of the apparatus to be controlled.

As seen in Fig. 1 of the drawings, the upper end of the chamber of the cylinder 11 is connected by a conduit 24 to a reversing valve indicated generally at 27. The lower end of the chamber of the cylinder 11 is connected by conduit 28 to the control valve 21. The opposite side of the control valve is connected by a conduit 30 to the reversing valve. Oil is supplied to the system through the reversing valve 27, by a conduit 34 connected to a pump 35, which in turn is driven by a motor 36 for supplying the oil through means of a conduit 38 from a storage tank 39. The reversing valve 27 is also connected by a conduit 40 to the storage tank 39 to provide a return passage for the oil from the system to the storage tank. A conduit 41 connects the main control valve with the return duct 40 and serves, as will hereinafter be described, to provide a by-pass for accumulated seepage of oil within the control valve 21.

The reversing valve is of the spring operated type and normally when free is positioned so as to provide direct communication between the supply conduit 34 and the return conduit 40 so that when the control valve is not operating the fluid is by-passed in a closed system through the conduit 34, reversing valve 27, and the return 40 to the storage tank 39. The reversing valve may be selectively adjusted to either of two main operating positions as will hereinafter be described, by means of two solenoids indicated generally at 44 and 45. The respective solenoids are connected in separate electrical circuits, each including one of a pair of relatively sensitive, normally open snap switches indicated at 46 and 47 respectively, adapted to be actuated by a friction block 50, clamped on the shaft 19, as seen in Figs. 1 and 5. When the shaft 19 is rotated in one direction the block 50 rotates therewith until it engages and closes one of the snap switches, and thereby energizes the solenoid connected in circuit therewith, and further rotation of the shaft 19 may be made with the friction block arrested against the actuated snap switch. When the shaft 19 is rotated in the opposite direction, the friction block 50 disengages the snap switch previously actuated and effects opening of the circuit controlled thereby, and then engages and closes the other snap switch and thereby closes the other circuit and energizes the other solenoid.

The control valve 21 includes a main body 55 provided with a cylindrical bore 56 in which there is snugly fitted a sleeve 58 formed as an integral extension of the shaft 17. The sleeve is provided with two pair of axially spaced apart ports 60 and 61, with the ports of each pair disposed in diametrically opposite relation. The ports 60 are disposed in registration with an annular chamber 63 formed in the bore of the body 55 and communicating with the annular chamber is a port 64 providing direct communication with the conduit 28. Disposed in registration with the two ports 61 is an annular chamber 65 which is directly connected through the medium of a port 66 to the conduit 30.

Telescoped and rotatably mounted within the sleeve 58 is an extension portion 70 of the shaft 19. Said extension portion 70 and the sleeve 58 constitute two cooperating movable valve elements of the control valve 21. The extension portion 70 is provided with two diametrically opposite, longitudinally extending passageways or slots 72, the ends of which terminate in approximate alignment with the outer walls of the respective chambers 63 and 65. The free or open end of the sleeve 58 has a segmental portion removed therefrom to provide a pair of abutment shoulders 73 and 74, adapted to be engaged by a stop pin 75 fixedly secured in the terminal portion 70 of the shaft 19, as seen in the drawings. As will be presently described in detail, the control valve may assume either of two main operating positions, with the valve element 70 rotatably adjustable within the sleeve 58, to two positions, 180° apart. Hence the abutment shoulders 73 and 74 are located in such relation as to accommodate 180° of rotary movement of the inner valve element 70 with respect to the outer valve element 58.

The shaft 17, adjacent the closed end of the sleeve, is formed with a stop shoulder 17ᵃ, and the shaft 19 is provided with a stop collar 19ᵃ, disposed in abutting enegagement with the end of the sleeve 58. The shoulder 17ᵃ and the outer end of the collar 19ᵃ are adapted to be engaged by packing nuts 77, threaded into the respective ends of the bore of the valve body so as to maintain the two valve elements 58 and 70 in cooperating relation, within the valve body.

The closed end of the sleeve 58 is provided with a plurality of bleeder ports 79 which open into a cavity indicated at 80, for accumulating the seepage of oil between the valve elements 58 and 70 as well as between the valve element 58 and the inner wall of the valve body. The opposite end of the valve assembly is provided with a chamber 81 for similarly accumulating oil seepage, and the two chambers 80 and 81 are interconnected by a duct 83 which in turn is connected to the conduit 41 for draining off the accumulated seepage and returning it to the storage tank 39. This arrangement permits disposing of such accumulated seepage and eliminates the possibility of back pressures developing within the control valve.

*Operation*

When it is desired to raise the piston 12 within the cylinder 11, for raising a platen or other element, the hand wheel 23 is rotated in counterclockwise direction (when viewed from the right hand end of Fig. 1), an amount not exceeding one-half revolution and preferably in the range of 90°. During such rotative movement the friction block 50 closes the snap switch 46, closing an electrical circuit and energizing the solenoid 44, which actuates the reversing valve and causes it to assume a position of adjustment to complete port registrations for the supplying of oil from the conduit 34 directly into the conduit 30, to the control valve 21. Simultaneously, the reversing valve completes registration of its ports to provide communication between the end of the conduit 24 and the return duct 40. During such movement of the hand wheel 23 the stop pin 75 will be caused to engage abutment shoulder 73 of the sleeve 58, at which time the two sets of ports 60 and 61 are in full registration with the respective passageways 72 as seen in Fig. 3 of the drawings. Oil is then permitted to flow from the conduit 30 into the chamber 65 and thence through the ports 61 into the passageways 72 and discharges at the opposite end of the passageways through the ports 60, into the chamber 63, and thence into the conduit 28, for supplying the oil to the lower end of the chamber of the cylinder 11, below the piston 12, and thereby causing the piston element to move upwardly. By virtue of the adjustment of the reversing valve, the oil located above the piston element is free to return through the conduit 24 to the reversing valve 27, and through the return conduit 40, back to the storage tank 39. Such upward movement of the piston moves the rack 14 therewith, and thereby rotates the pinion 16 in counterclockwise direction as viewed from the right hand end of Fig. 1. As long as the valve elements 58 and 70 remain with their ports in registered relationship as seen in Figs. 3 and 4 of the drawings, the full and constant supply of oil from the pump 35 enters the lower end of the cylinder 11 for causing a constant, uniform upward movement of the piston. To maintain such a relationship of the ports of the valve elements, the hand wheel 23 must be continuously rotated in counterclockwise direction, to maintain synchronized relationship between the shafts 19 and 17. In order to obtain such continuous movement of the piston, such synchronism is necessary, because after the initial registration of the ports is accomplished by adjustment of the valve, as represented by the sections 3 and 4, and the hand wheel is arrested, the oil causes the piston to be raised and thereby rotates the shaft 17, through the rack and pinion and causes rotation of the sleeve 58 so as to dispose its ports 60 and 61 out of registration with the passageways 72. Hence continued movement of piston may only be effected by maintaining continuous registration of the ports 60 and 61 of the sleeve with the two passageways 72, of the shaft extension 70.

Figure 6:
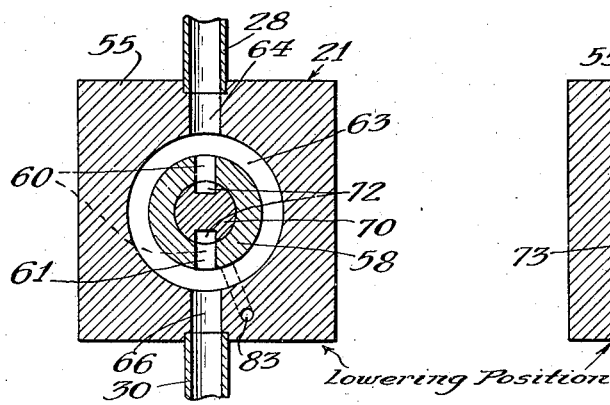
Figs. 6 and 7 are transverse sectional views corresponding generally to Figs. 3 and 4 respectively, but showing the parts in a position of adjustment for effecting lowering movement of the piston element.
Figure 7:
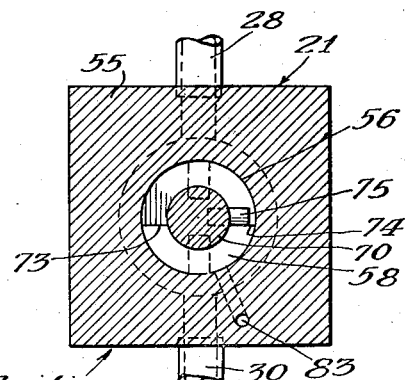

To effect a lowering of the piston and mechanism controlled thereby, the hand wheel 23 is rotated in clockwise direction (as may be viewed from the right hand end of Fig. 1), first causing the friction block 50 to disengage snap switch 46 so as to permit it to open the electrical circuit which controls the solenoid 44, and then causing the friction block 50 to engage and close snap switch 47, to complete the circuit including the solenoid 45. After 180° reverse movement of the hand wheel, the valve element 70 is reversed in the sleeve and the passageways 72 are again registered with ports 60 and 61 as seen in Fig. 6. When solenoid 45 is energized the reversing valve 27 then assumes a position of adjustment of its ports for supplying oil directly from the conduit 34 to the conduit 24 for discharging into the upper end of the cylinder 11. The oil in the lower portion of the cylinder, below piston 12, is then permitted to discharge through the conduit 28 and the control valve 21 and then through the conduit 30, and through the ports of the reversing valve 27, into the return conduit 40, and back to the storage tank 39. Such reverse rotation of the hand wheel 23, results in lowering of the piston and mechanism controlled thereby, and such movement will be continuous and uniform only so long as proper registration is maintained between the ports of the valve element 58 and the passageways 72 of the valve element 70. To assist in maintaining such registration, the stop pin 75 is then held in engagement with the abutment shoulder 74 of the sleeve as seen in Fig. 7 of the drawings. As long as rotation is continuously imparted to the hand wheel 23 to maintain pin 75 in engagement with abutment shoulder 74, registration of the ports 60 and 61 with the two passageways 72 will be effected and a full and constant supply of oil will flow from the lower end of the cylinder, thereby obtaining a uniform, continuous, downward movement of the piston and the apparatus controlled thereby. If after such initial adjustment of the hand wheel, to dispose the valve elements in registration, the operator disengages himself from the wheel, in such event downward movement of the piston will continue for a limited period at a diminishing speed, causing pinion 16 to rotate in clockwise direction and thereby effecting rotation of the sleeve 58 relative to the valve element 70, until the ports 60 and 61 are out of registration with the passageways 72. When this takes place the piston becomes arrested until the hand wheel is again moved in either direction, depending upon the direction of movement desired for the piston 12.

Figure 8:
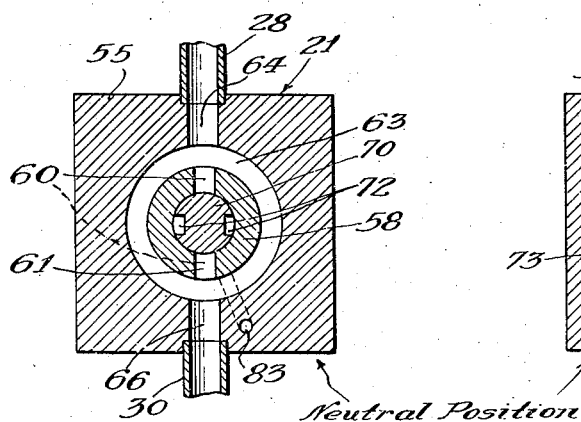
Figs. 8 and 9 are sectional views similar to Figs. 3 and 4 respectively, but showing the parts of the valve mechanism adjusted at a neutral inoperative position.
Figure 9:
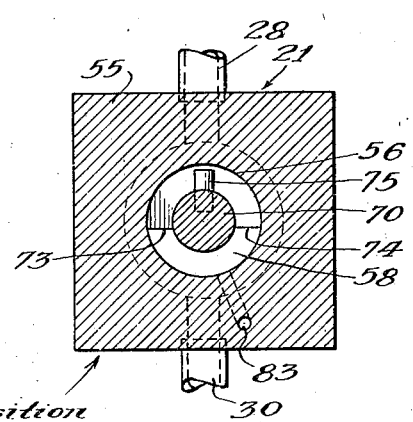

When it is desired to leave the control valve in an inoperative position, I prefer that the hand wheel be rotated in reverse direction approximately 90°, so as to dispose the stop pin 75 approximately midway between the two abutment shoulders 73 and 74 of the sleeve, as seen in Fig. 9, with the ports 60 and 61 disposed in midway relation to passageways 72, as seen in Fig. 8.

It will be apparent that by virtue of the construction described that extremely accurate and exact adjustment may be made of apparatus adapted to be moved or positioned by the movement of the piston 12. While my apparatus may permit of relatively accurate and exact control, I am also able to obtain full use of the hydraulic pressures acting upon the piston. It will therefore be apparent that by virtue of the novel control and apparatus embodying this invention that a constant fluid pressure is utilized while the volume of fluid may be varied for maintaining relatively accurate control and positioning of elements of other mechanisms or devices.

It is to be understood that if desired the reversing valve could be manually operated, or operated by other mechanical connections with the shaft 19. Furthermore, if desired, suitable limit switches may be employed in the solenoid circuits, adapted to open the circuits when the piston or elements being moved arrive at their respective operative limits.

While I have herein shown and described a preferred embodiment of my invention, manifestly it is capable of modification and rearrangement without departing from the spirit and scope thereof. I do not, therefore, wish to be understood as limiting this invention to the precise embodiment herein disclosed, except as I may be so limited by the appended claims.

I claim as my invention:

1. In combination, a fluid control valve comprising a body provided with a bore formed with two axially spaced apart chambers and a pair of main fluid ports opening into the respective chambers, a pair of oppositely extending axially aligned rotatable shafts, a pair of cooperating valve elements connected respectively to the adjacent ends of said shafts and mounted in said bore, one of said valve elements being a sleeve journaled in the bore and having a pair of axially spaced aligned ports disposed in registration with the respective chambers, the other valve element being a cylindrical plug telescoped into the sleeve and having an axially extending passageway, adapted in one position of rotative adjustment, relatively to the sleeve, to provide communication between said ports of the sleeve, fluid operated means operable under control of said control valve and including a chamber, a fluid pressure responsive member in the chamber, means interconnecting said member and one of said shafts for rotating the latter in response to movement of said member, a reversing valve, a source of fluid supply, a fluid pump associated with the source of supply, a conduit connecting said reversing valve to the pump, a conduit connecting the reversing valve and one main port of the control valve, a conduit connecting the reversing valve to one end of the chamber of the fluid operating means, a conduit connecting the other main port of the control valve to the other end of said chamber of the fluid operating means, a conduit connecting the reversing valve to the source of supply, means responsive to the rotation of the other shaft in one direction for moving the reversing valve to one position of adjustment for causing fluid to flow through the control valve to one end of the chamber of the fluid operating means for moving said member in one direction and simultaneously causing fluid at the opposite end of the chamber to return to the source of supply, rotation of said other shaft in the other direction causing said means to move the reversing valve to another position for causing fluid to flow directly to said other end of the chamber of the fluid operated means, moving said member in the opposite direction, and simultaneously causing the fluid at the said one end of the chamber to flow through the control valve to the source of supply, whereby flow of fluid through the control valve continues as long as said shafts continue to be rotated in substantial synchronism with each other.

2. In combination, a fluid control valve comprising a body provided with a bore formed with two axially spaced apart chambers and a pair of main fluid ports opening into the respective chambers, a pair of oppositely extending axially aligned rotatable shafts, a pair of cooperating valve elements connected respectively to the adjacent ends of said shafts and mounted in said bore, one of said valve elements being a sleeve journaled in the bore and having a pair of axially spaced aligned ports disposed in registration with the respective chambers, the other valve element being a cylindrical plug telescoped into the sleeve and having an axially extending passageway, adapted in one position of rotative adjustment, relatively to the sleeve, to provide communication between said ports of the sleeve, fluid operated means operable under control of said control valve and including a chamber, a fluid pressure responsive member in the chamber, means interconnecting said member and one of said shafts for rotating the latter in response to movement of said member, a reversing valve, a source of fluid supply, a fluid pump associated with the source of supply, a conduit connecting said reversing valve to the pump, a conduit connecting the reversing valve and one main port of the control valve, a conduit connecting the reversing valve to one end of the chamber of the fluid operating means, a conduit connecting the other main port of the control valve to the other end of said chamber of the fluid operating means, a conduit connecting the reversing valve to the source of supply, means responsive to the rotation of the other shaft in one direction for moving the reversing valve to one position of adjustment for causing fluid to flow through the control valve to one end of the chamber of the fluid operating means for moving said member in one direction and simultaneously causing fluid at the opposite end of the chamber to return to the source of supply, rotation of said other shaft in the other direction causing said means to move the reversing valve to another position for causing fluid to flow directly to said other end of the chamber of the fluid operated means, moving said member in the opposite direction, and simultaneously causing the fluid at the said one end of the chamber to flow through the control valve to the source of supply, whereby flow of fluid through the control valve continues as long as said shafts continue to be rotated in substantial synchronism with each other, said last mentioned means comprising two solenoids operably connected to the reversing valve, a pair of separate normally open switches disposed adjacent opposite sides of said other shaft, each switch connected in a separate electrical circuit with one of the solenoids, and means frictionally mounted on said other shaft in position to engage and close one switch and actuate one solenoid when said other shaft is rotated in one direction, and adapted to engage and close the other switch to actuate the other solenoid when said other shaft is rotated in the opposite direction.

3. In combination, a fluid control valve comprising a body provided with a bore formed with two axially spaced apart chambers and a pair of main fluid ports opening into the respective chambers, a pair of oppositely extending axially aligned rotatable shafts, a pair of cooperating valve elements connected respectively to the adjacent ends of said shafts and mounted in said bore, one of said valve elements being a sleeve journaled in the bore and having a pair of axially spaced aligned ports disposed in registration with the respective chambers, the other valve element being a cylindrical plug telescoped into the sleeve and having an axially extending passageway, adapted in one position of rotative adjustment, relatively to the sleeve, to provide communication between said ports of the sleeve, stop means comprising interengaging features on said valve elements for limiting rotation of one element relatively to the other, fluid operated means operable under control of said control valve and including a chamber, a fluid pressure responsive member in the chamber, means interconnecting said member and one of said shafts for rotating the latter in response to movement of said member, a reversing valve, a source of fluid supply, a fluid pump associated with the source of supply, a conduit connecting said reversing valve to the pump, a conduit connecting the reversing valve and one main port of the control valve, a conduit connecting the reversing valve to one end of the chamber of the fluid operating means, a conduit connecting the other main port of the control valve to the other end of said chamber of the fluid operating means, a conduit connecting the reversing valve to the source of supply, means responsive to the rotation of the other shaft in one direction for moving the reversing valve to one position of adjustment for causing fluid to flow through the control valve to one end of the chamber of the fluid operating means for moving said member in one direction and simultaneously causing fluid at the opposite end of the chamber to return to the source of supply, rotation of said other shaft in the other direction causing said means to move the reversing valve to another position for causing fluid to flow directly to said other end of the chamber of the fluid operated means, moving said member in the opposite direction, and simultaneously causing the fluid at the said one end of the chamber to flow through the control valve to the source of supply, whereby flow of fluid through the control valve continues as long as said shafts continue to be rotated in substantial synchronism with each other, said last mentioned means comprising two solenoids operably connected to the reversing valve, a pair of separate normally open switches disposed adjacent opposite sides of said other shaft, each switch connected in a separate electrical circuit with one of the solenoids, and means frictionally mounted on said other shaft in position to engage and close one switch and actuate one solenoid when said other shaft is rotated in one direction, and adapted to engage and close the other switch to actuate the other solenoid when said other shaft is rotated in the opposite direction.

4. A fluid control valve comprising a body provided with a bore having two axially spaced apart annular chambers, and a pair of main fluid ports opening into the respective chambers, a pair of oppositely extending axially aligned rotatable shafts, a pair of cooperating valve elements connected respectively to the adjacent ends of said shafts and mounted in said bore, one of said valve elements being a sleeve journaled in the bore and having two sets of axially spaced apart aligned ports disposed in registration with the respective annular chambers, the ports of each set being disposed in circumferentially spaced apart relation to each other, the other valve element being a cylindrical plug telescoped into the sleeve and having two corresponding circumferentially spaced apart axially extending passageways, adapted in one position of rotative adjustment, relatively to the sleeve, to register respectively with corresponding ports of the respective sets in said sleeve, fluid operated means operable under control of said valve and including a member operably connected to one of said shafts for rotating the latter in response to actuation of said means, a conduit connecting one end of said means to one main port of the control valve, a source of fluid supply, a conduit connecting the other main port of the control valve to said source of supply, a conduit connecting the other end of said means to the source of supply, and a reversing valve interconnecting said last two conduits to the source of supply for controlling the direction of fluid flow through the ports of the control valve, means for rotating the other shaft, whereby to control the operation of said means, and stop means comprising interengaging features on said valve elements for limiting rotation of one relatively to the other in opposite directions, said stop means being so constructed and arranged as to cause alternate registrations of said passageways with correspondingly aligned ports of said sleeve when the valve elements are disposed at their two respective limits of rotation of one relatively to the other.

5. The combination with a fluid control system having a source of fluid under pressure and a device to be selectively actuated thereby, of a reversing valve for controlling the direction of flow of fluid to said device to be actuated, a control valve interposed in said system between said reversing valve and said device to be actuated, manually operative means for opening said control valve, other means actuated responsive to movement of said device to be actuated for closing said control valve, and electrical means actuated by said manually operative means for controlling the direction of fluid flow through said reversing valve.

6. The combination with a fluid control system having a source of fluid under pressure and a device to be selectively actuated thereby, of a reversing valve for controlling the direction of flow of fluid to said device to be actuated, a control valve interposed in said system between said reversing valve and said device to be actuated, two valve members telescopically disposed within the control valve and having ports movable into and out of registry for opening and closing said control valve, manually operative means for actuating one of said valve members for opening said control valve, other means actuated responsive to movement of said device to be actuated for actuating the other of said valve members to close said control valve, and electrical means actuated by said manually operative means for controlling the direction of fluid flow through said reversing valve.

CARL J. KOPP.